(12) United States Patent
Fei et al.

(10) Patent No.: US 11,719,801 B2
(45) Date of Patent: Aug. 8, 2023

(54) METHOD FOR PROVIDING AT LEAST ONE PIECE OF TARGET INFORMATION

(71) Applicant: HELLA GmbH & Co. KGaA, Lippstadt (DE)

(72) Inventors: Tai Fei, Hamm (DE); Frank Gruenhaupt, Marsberg (DE); Andreas Von Rhein, Salzkotten (DE); Ernst Warsitz, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 198 days.

(21) Appl. No.: 17/188,676

(22) Filed: Mar. 1, 2021

(65) Prior Publication Data

US 2021/0270952 A1 Sep. 2, 2021

(30) Foreign Application Priority Data

Feb. 28, 2020 (DE) ........................ 10 2020 105314.2

(51) Int. Cl.
*G01S 13/34* (2006.01)
*G01S 7/35* (2006.01)
*G01S 13/931* (2020.01)

(52) U.S. Cl.
CPC ............ *G01S 13/343* (2013.01); *G01S 7/352* (2013.01); *G01S 13/346* (2013.01); *G01S 13/931* (2013.01); *G01S 7/356* (2021.05)

(58) Field of Classification Search
CPC ...... G01S 13/346; G01S 13/931; G01S 7/352; G01S 7/356
See application file for complete search history.

(56) References Cited

U.S. PATENT DOCUMENTS

| 7,336,218 B2 | 2/2008 | Nishimura et al. |
| 2018/0017678 A1 * | 1/2018 | Warke ...................... G01S 17/10 |
| 2019/0129004 A1 | 5/2019 | Jaeger |

FOREIGN PATENT DOCUMENTS

| CN | 104977566 A | * | 10/2015 | |
| CN | 107422308 A | * | 12/2017 | |
| DE | 10 2009 045 677 A1 | | 4/2011 | |
| DE | 11 2005 000 763 B4 | | 9/2011 | |
| DE | 10 2017 125 171 B3 | | 2/2019 | |
| EP | 0543985 A1 | * | 6/1993 | ........... G01S 13/953 |
| JP | 2001166025 A | * | 6/2001 | ........... G01S 3/8086 |
| WO | WO 2019/215732 A1 | | 11/2019 | |

* cited by examiner

*Primary Examiner* — Timothy A Brainard
(74) *Attorney, Agent, or Firm* — Muncy, Geissler, Olds & Lowe, P.C.

(57) ABSTRACT

A method for providing at least one piece of target information relating to at least one object detected by a radar system of a vehicle, the following steps being carried out: providing a piece of detection information of the radar system; and carrying out a processing of the detection information, at least one windowing and at least one frequency analysis of the detection information being carried out for the purpose of providing therefrom the at least one piece of target information, the at least one piece of target information being provided with the aid of different window functions of the windowing, depending on an evaluation criterion, the evaluation criterion being specific to a signal strength of the target information.

14 Claims, 7 Drawing Sheets

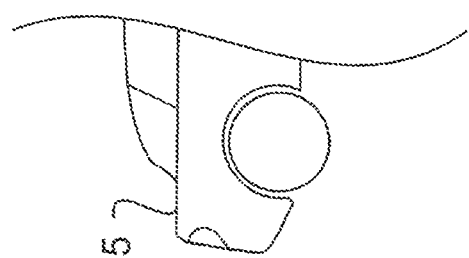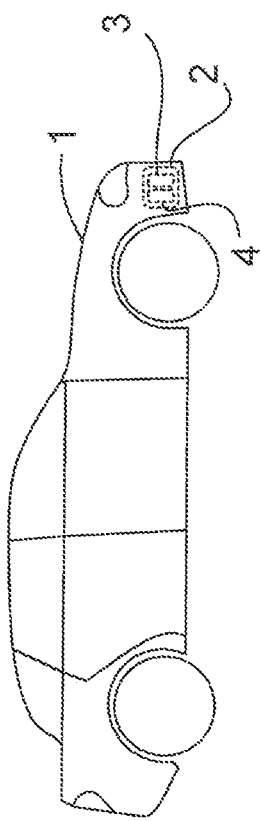
Fig. 1

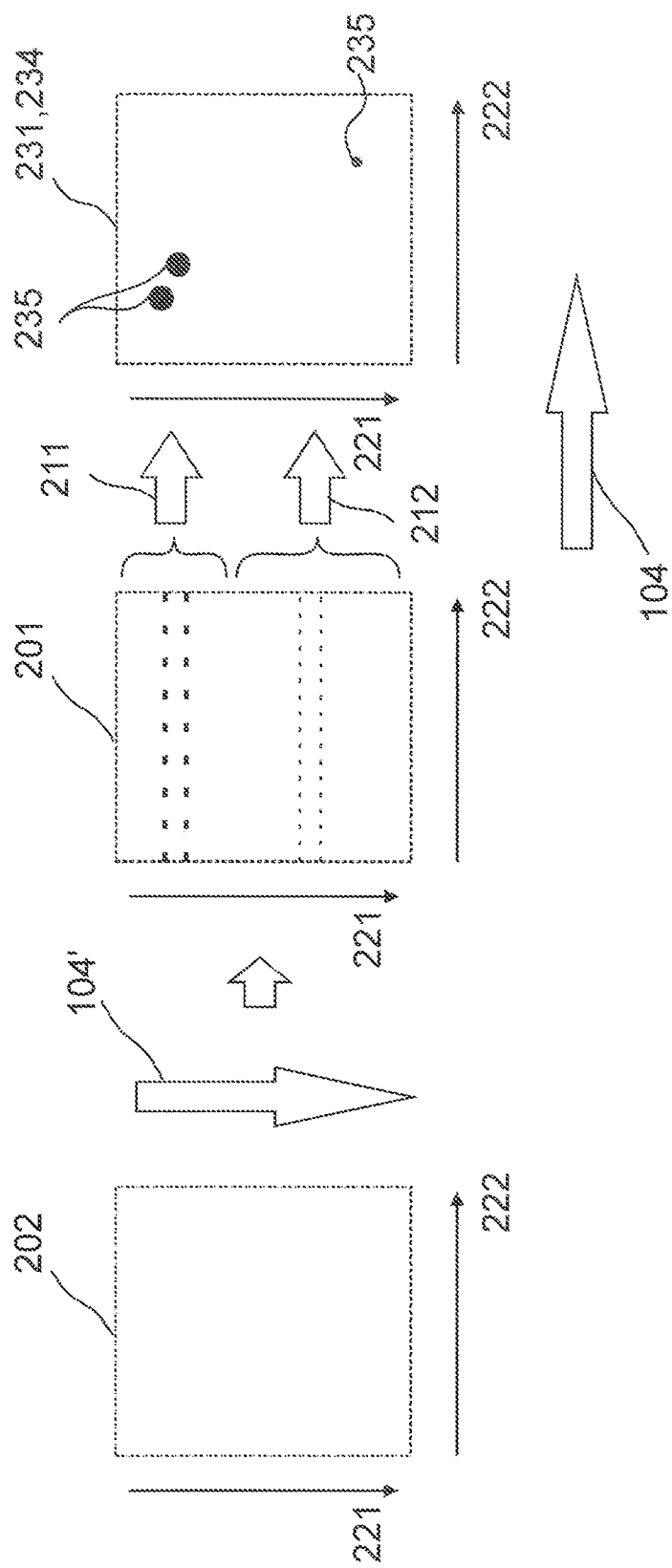

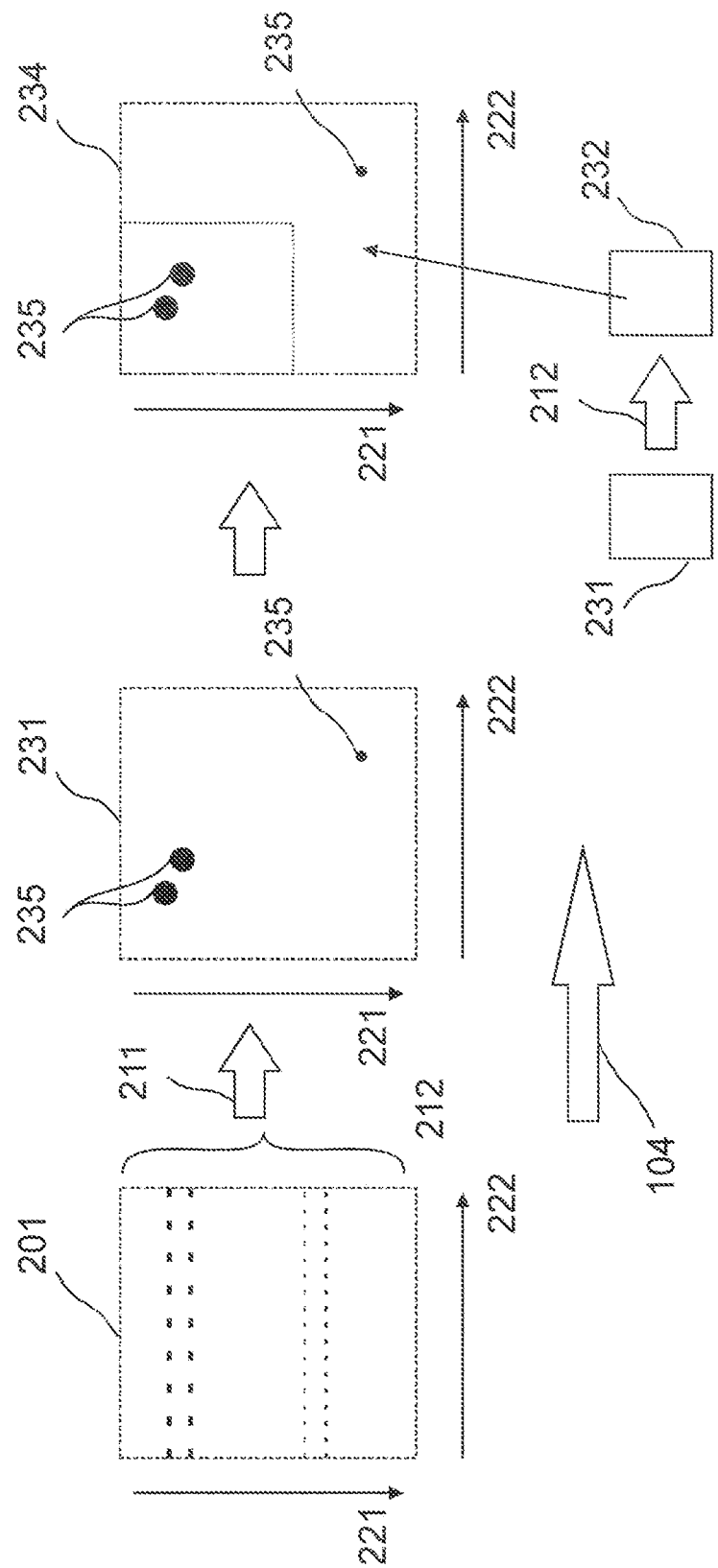

METHOD FOR PROVIDING AT LEAST ONE PIECE OF TARGET INFORMATION

This nonprovisional application claims priority under 35 U.S.C. § 119(a) to German Patent Application No. 10 2020 105 314.2, which was filed in Germany on Feb. 28, 2020 and which is herein incorporated by reference.

BACKGROUND OF THE INVENTION

Field of the Invention

The present invention relates to a method of providing at least one piece of target information to detect targets.

Description of the Background Art

It is known from the prior art that frequency modulated continuous radar devices, also known as FMCW radar, are used to detect objects in vehicles. A radar system of this type is known, for example, from the publication WO 2019/215732.

FMCW radars frequently work with a periodic frequency modulation, which takes place in an essentially temporally linear manner. The modulation may be carried out cyclically. A transition of this type from the lowest to the highest frequency is frequently referred to as chirp. If a transmit signal having chirps of this type is repeatedly emitted by the radar system, it is possible to determine not only the distance of a detected object but also the relative velocity with the aid of the Doppler frequency. The use of an antenna array having at least two adjacent receiving antennas further permits the evaluation of the angle of incidence of the transmit signal reflected by the object and thus the direction of the object.

To detect the object, the transmit signal reflected on the object and delayed by the propagation time may first be received and then transferred to a lower frequency. A downmixing to the baseband may take place for this purpose. The received signal may subsequently be converted into an piece of digital information by means of analog/digital conversion. By processing this information, at least one piece of target information may be ascertained, which permits objects to be detected and the parameters of the object to be determined, such as the distance, the relative velocity and the direction. For this purpose, at least one Fourier transform may be carried out, starting with the digitized signal. A windowing is usually also carried out by a windowing function, for example with the aid of a Hann window or a Blackman window. The window function defines the weighting with which the sampled values obtained during the sampling of the received signal are incorporated into subsequent processing steps within a segment (window). The use of a window function (with the exception of the rectangular window function) makes it possible to reduce interfering effects, such as a leakage effect.

However it has proven to be disadvantageous that some objects and their parameters are no longer reliably detectable in this procedure.

SUMMARY OF THE INVENTION

It is therefore an object of the present invention to at least partially eliminate the disadvantages described above. In particular, the object of the present invention is to improve the provision of target information needed to detect the objects and/or determine the parameters.

The object is achieved in an exemplary embodiment, in particular, by a method for providing at least one piece of target information relating to at least one object detected by a radar system of a vehicle. The vehicle is, for example, a motor vehicle and, in particular, a passenger car, which is able to use the radar system for monitoring surroundings of the vehicle. For example, objects outside the vehicle, such as preceding vehicles or obstacles, are detected in this way.

It is provided, in particular, that the following steps are carried out, preferably consecutively or in an arbitrary sequence, it also being possible to repeatedly carry out individual and/or all steps: Providing a piece of (digital) detection information of the radar system, the detection information preferably being specific to an electromagnetic signals emitted by the radar system, reflected on the object and received by the radar system in a delayed manner, due to a propagation time; and Carrying out an (in particular digital signal) processing of the detection information, at least one windowing and/or at least one frequency analysis (such as a Fourier transform) of the detection information being carried out to provide the at least one piece of target information therefrom.

The at least one piece of target information may be provided with the aid of different window function of the windowing, depending on an evaluation criterion, the evaluation criterion advantageously being specific to a signal strength of the target information. In other words, the evaluation criterion may be used to predefine which of the different window functions is used to provide the target information. This has the advantage that not only one single defined window function is used to provide the target information, but the different window functions may be used, depending on the evaluation criterion. A result of the frequency analysis may be a piece of frequency information, such as a spectrum, which includes the at least one piece of target information, e.g., as a peak value or the like. The evaluation criterion is, for example, a signal strength of the target information, which is ascertainable, for example, based on an amplitude of the peak value in the frequency information and/or a power in a partial range of the detection information. The different window functions may be provided specifically for different versions of the evaluation criterion (such as strong and weak signals). A differentiation between strong and weak signals may take place, for example, by a comparison with a threshold value.

The invention is based, in particular, on the finding that some objects and/or their parameters may no longer be reliably detected due to the windowing. In the case, in particular, that the transmit signal reflected on the object is only weakly received by the radar system, the additional weakening of the detection information may result in that the object is no longer detectable. One of the window functions, which carries out the weakening to a lesser degree, may therefore be used for this case.

It is possible that multiple frequency analyses, in particular Fourier transforms, may be carried out consecutively for processing purposes. This type of processing is described in greater detail below as an example. A two-dimensional (2D) matrix, which is designated below as receive information, may be used as a starting point. The first Fourier transform may be carried out in the case of the receive information along a first dimension ("range" dimension) to obtain the detection information in the form of a further 2D matrix. A piece of information relating to the distance of the detected object may be ascertained in this way. In the case of the detection information, the windowing and/or the second Fourier transform along a second dimension (Doppler frequency dimension) may then supply a piece of information relating to the relative velocity of the detected object. The detection information may be provided as a 2D matrix, in which spectra specific to the distance are provided row by row (the rows extend in the direction of the first dimension).

The frequency information may be ascertained as the result of this last second Fourier transform (in the form of a 2D spectrum). This frequency spectrum is also referred to as a range Doppler spectrum, and includes the at least one piece of target information relating to a detected object in each case (as a piece of information). The above procedure may be also be repeated for further window functions of the windowing to obtain multiple of the pieces of frequency information. The latter then have the same, though differently windowed, target information (as duplicates, so to speak).

Each piece of target information indicates one detected object. The target information is marked in the range Doppler spectrum, e.g. by a peak value, whose position is dependent on the distance of the object in the direction of the first dimension and dependent on the relative velocity of the object in the direction of the second dimension.

It is furthermore conceivable that the different window functions of the windowing comprise a window function deviating from a rectangular window function and the rectangular window function. It is understood thereby that the rectangular window function may be an "essentially" rectangular window function, which has little effect on a weakening of the detection information in the area of the window. Weak objects may also be detected in this way. On the other hand, interfering effects, such as the leakage effect, may be mitigated by window functions deviating from the rectangular window functions. In principle, the window function with the rows of the (two-dimensional) detection signals may be multiplied before the frequency analysis for the purpose of windowing. The Hann window may be used as an advantageous window function with little leakage effect. The window function deviating from the rectangular window function, also referred to as the first window function, is designed, for example, as a Hann window or a Blackman window.

Within the scope of the invention, it is furthermore optionally possible that the detection information is ascertained by the following steps: Detecting a receive signal in the time range, the receive signal being able to be specific to a transmit signal emitted by the radar system and reflected on at least one object; and Carrying out (at least) one Fourier transform to ascertain the detection information from the receive signal, so that, due to the Fourier transform, the detection information preferably comprises at least one spectrum which is specific to a distance of the at least one object.

To detect the object, the transmit signal may be first emitted by the radar system via at least one transmitting antenna. The transmit signal comprises, for example, multiple sequentially output signal sequences (hereinafter referred to as chirps), which are each frequency-modulated and thus have a varying frequency. For example, a linear frequency modulation may be used, in which the frequency of a particular chirp is varied linearly within a predefined bandwidth. If N chips are output, the time period of a particular chirp is T1/N. After time period T1, the processing of the digitized receive signal (referred to as the receive information) may take place within period T2-T1. The entire measurement cycle thus has a time period T2. Due to the at least one detected object, the emitted transmit signal may be reflected and thus reach a receive antenna of the radar system, delayed by a propagation time. The signal received in this way may then be demodulated and/or downmixed, in particular by a downmixer. The signal may be subsequently converted into the digital piece of receive information by an analog/digital converter. Until the end of time period T1, the data ascertained hereby may be stored consecutively in time in a two-dimensional manner in an M×N matrix with M samples per chirp and N chirps to obtain the receive information as two-dimensional receive information. One of the dimensions is thus specific to a distance to the object; the other dimensions are specific to the Doppler frequency and thus to the relative velocity of the object. Based on this matrix, at least one spectrum may be ascertained by at least one Fourier transform of the matrix (i.e. the receive information), from which the relative velocity and/or the distance of the at least one object may be determined in the surroundings of the vehicle. In concrete terms, a spectrum may be ascertained column by column from a column-by-column first Fourier transform of the receive information, the spectrum again being constituted as a two-dimensional matrix according to the receive information.

It may thus be provided that the detection information is designed as a or the aforementioned two-dimensional matrix, which includes a piece of distance information relating to the object in a first dimension and is specific to a relative velocity of the object in a second dimension.

It may be optionally provided that the window function deviating from the rectangular window function is designed to carry out a weakening of the detection information during the windowing, in particular according to a predefined weighting (due to the type of window function). To obtain the target information, a two-dimensional Fourier transform (e.g. in the form of two consecutive Fourier transforms) of the digitized receive signal may be carried out to obtain the so-called "range Doppler spectrum," i.e. the frequency information. The indices along the two dimensions are proportional therein to the distance and to the relative velocity of the objects within visual range of the radar system. The probability of an object detection and the quality of the estimation of the parameters of the detected objects are dependent, in particular, on a signal-to-noise ratio in the frequency information and/or the detection information and/or the receive information. The selection of the window function has a great influence on the power of the signal and the background noise in the frequency information. The use of weak target information may be improved by carrying out a selection of the window function. Unlike in other window functions, no weakening of the signal at the edges is carried out in the rectangular window function. The rectangular window function may therefore be used for windowing for weak pieces of target information.

For example, it may be provided that, during processing, the windowing is carried out with the aid of the different window functions for different subareas (such as one or multiple rows) of the detection information, the following steps being advantageously carried out for the particular subarea: Carrying out a selection of the different window functions, depending on a signal strength in the particular subarea of the detection information, this signal strength also being able to be specific to the signal strength of the target information; and Carrying out the windowing of the subarea, using the selected window function.

The selection may take place, for example according to the evaluation criterion, in such a way that the rectangular window function is used for weak subareas and the window function deviating from the rectangular function is otherwise used for windowing the subarea. Weak subareas may be compared with a threshold value, for example by a comparison of the power in the subarea. For example, the values in the subarea may be accumulated to ascertain the power.

It may be possible that, during the processing, the windowing and the frequency analysis of the detection information are carried out for each of the window functions to obtain a piece of frequency information in each case with the aid of one of the window functions. In other words, each provided window function may also be applied for the purpose of generating a piece of frequency information assigned to this window function in each case. For example, for this purpose, the carrying out of the windowing and/or the processing may include the following steps, which are carried out, in particular, for each processing of a piece of detection information, for example in each period T2: Carrying out the windowing of the (in particular entire or most of the) detection information using a first of the different window functions to obtain a first of the pieces of frequency information assigned to the first window function by the frequency analysis of the windowed detection information; and Carrying out the windowing of the (in particular entire or most of the) detection information using a second of the different window functions to obtain a second of the pieces of frequency information assigned to the second window function by the frequency analysis of the windowed detection information.

Two pieces of frequency information may be ascertained in this way, which result from windowing with the aid of different window functions. Additional windowing operations and frequency analyses for additional window functions may possibly also be carried out. The parallel application of the different window functions to the same data (the detection information) effectuates an ascertainment of frequency information having the same content and thus also target information having the same content. Due to the different window functions, the target information may not be able to be evaluated, or only to a reduced degree, in one of the pieces of frequency information (e.g. due to noise), while it may be able to be evaluated in another piece thereof. The following steps may therefore also be provided: Ascertaining the signal strength of the particular piece of target information in at least one of the pieces of frequency information; and Carrying out a selection of the pieces of target information from the different pieces of frequency information, depending on the ascertained signal strength, to provide the target information in this manner with the aid of different window functions of the windowing (depending on the evaluation criterion).

If is furthermore advantageous if, within the scope of the invention, final piece of frequency information is determined as the result of the processing, which is made up of different pieces of frequency information for the purpose of finally providing the pieces of target information with the aid of different window functions of the windowing. The availability of multiple pieces of frequency information having the same content from different windowings therefore has the advantage that a piece of target information which has too low a signal strength in one piece of frequency information may be taken from the other piece of frequency information.

It may be advantageous if, within the scope of the invention, a selection based on the evaluation criterion is carried out for each of the pieces of target information, with the aid of which the target information is provided in the final piece of frequency information from the different pieces of frequency information. In other words, the target information may be taken from either the first or second piece of frequency information for the final piece of frequency information, depending on the evaluation criterion. The pieces of target information in the final piece of frequency information may thus result from different window functions.

Moreover, it may be provided that the evaluation criterion comprises a comparison with a predefined threshold value. For example, the rectangular window function may be selected if the signal strength is below the threshold value, and otherwise the window function deviating from the rectangular window function may be selected for the windowing.

It may be advantageous if, within the scope of the invention, at least one parameter of the at least one object is ascertained by an evaluation of the provided piece of target information. The at least one parameter may be a distance of the object relative to the vehicle and/or a velocity of the object relative to the vehicle and/or a direction of the object relative to the vehicle. These pieces of information may then be transferred to other components of the vehicle, for example driving assistance systems.

It is optionally conceivable that, during the processing, the at least one frequency analysis is carried out in each case in the form of a Fourier transform for the purpose of ascertaining a piece of frequency information from the detection information, so that the frequency information comprises at least one spectrum, which is specific to a velocity of the at least one object. For example, the relative velocity relative to the vehicle may be ascertained in this way.

According to a further possibility, it may be provided that a selection of the window functions based on the evaluation criterion may be carried out in such a way that strong pieces of target information are optimized by the selected window function but weakened to a greater degree, and weak pieces of target information are weakened to a lesser degree by the selected window function and are thus retained.

It should furthermore be noted that the aforementioned methods for processing and, in particular, for windowing, may be carried out as a one- or two or possible three or multi-dimensional matrix for piece of detection information 201. One of the dimensions of the two-dimensional matrix may be, for example, the dimension specific to the distance of the object, and another of the dimensions of the matrix may be the dimension specific to the relative velocity of the object. For example, one of the dimensions may also be specific to the direction of the object. The frequency analysis for the windowed detection information may take place along each of the dimensions, for example instead of in the first dimension for the distance, it may also be along the second dimension for the relative velocity. A flexibly usable method for providing the target information thus results.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 1 and 2 show a schematic representation of a radar system for carrying out a method according to the invention; and FIGS. 3 through 7 show schematic representations for visualizing a method according to the invention.

DETAILED DESCRIPTION

Figure 2:
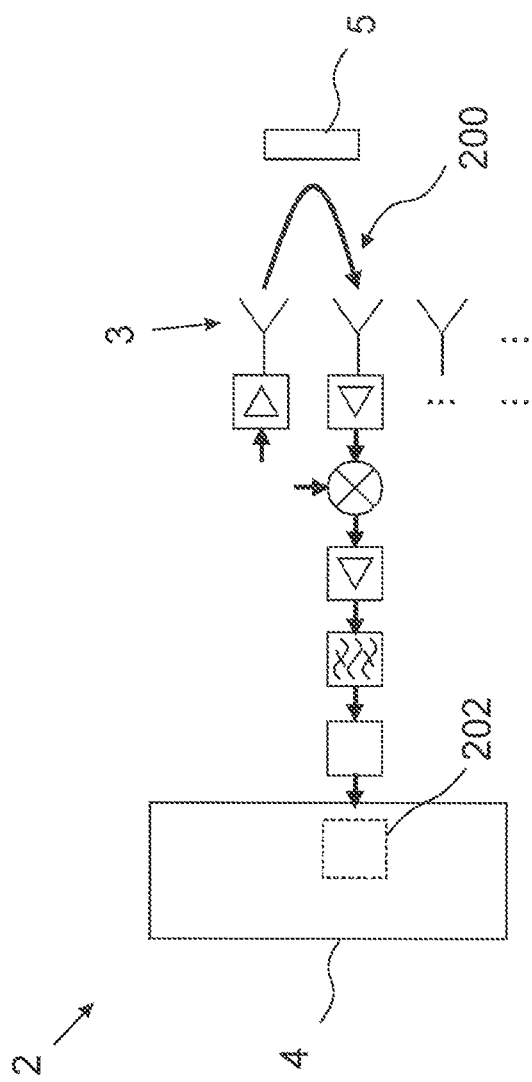

FIG. 1 shows a radar system 2, which may be mounted in a vehicle 1, for monitoring surroundings of vehicle 1. In this way, objects 5 may be detected in the surroundings, such as another vehicle 5. For this purpose, radar system 2 includes a radar sensor 3, which may comprise at least one transceiver antenna (cf. FIG. 2). A processing device 4 may also be provided for carrying out the method according to the invention by a computer program or the like. FIG. 2 illustrates that electromagnetic waves may be emitted by radar system 2, reflected by object 5 and received by radar system 2 as a receive signal 200. This receive signal 200 may be subsequently converted into a piece of digital receive information 202 and processed in processing device 4 for the purpose of ascertaining therefrom at least one piece of target information 235 relating to object 5.

In principle, a provision of the at least one piece of target information 235 may be made possible according to the method according to the invention with the aid of the following steps. According to a first method step, a provision 101 of a piece of detection information 201 of radar system 2 takes place, for example by a Fourier transform 104' of receive information 202. According to a second method step, a carrying out of a processing 102 of detection information 201 subsequently takes place, at least one windowing 103 and at least one frequency analysis 104 of detection information 201 being carried out within processing 102. A piece of frequency information 231, 232 may also be determined in each case via frequency analysis 104. The at least one piece of target information 235 may then be provided therefrom.

Figure 3:
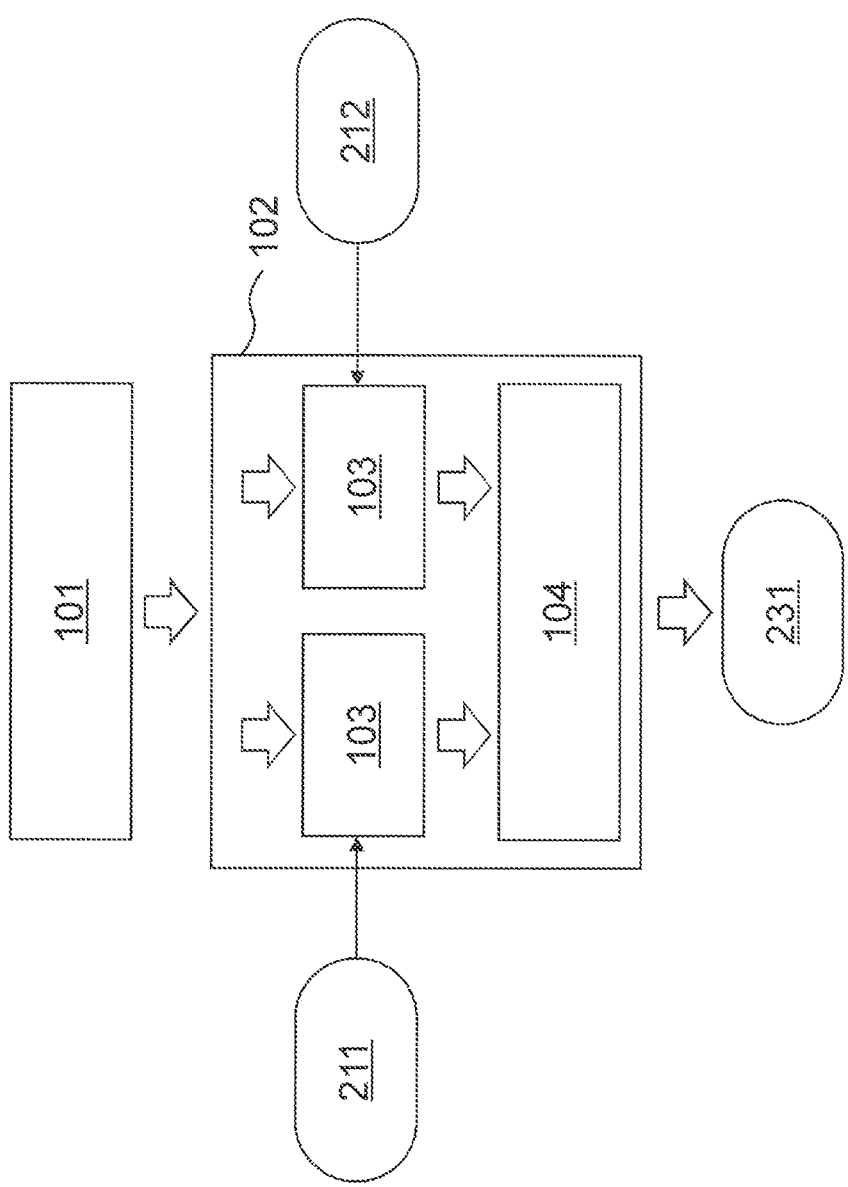

FIGS. 2 and 3 illustrate that the at least one piece of target information 235 (which is in the at least one piece of frequency information 231, 232 is provided with the aid of different window functions 211, 212 of windowing 103, depending on an evaluation criterion, the evaluation criterion being able to be specific to a signal strength of target information 235. The different window functions 211, 212 of windowing 103 may comprise a window function 211 deviating from rectangular window function 212 and rectangular window function 212. Window function 211 deviating from rectangular window function 212 may be designed to carry out a weakening of detection information 201 during windowing 103 according to a predefined weighting.

According to FIG. 3 and FIG. 6, windowing 103 may be carried out during processing 102 for different subareas of detection information 201, using the different window functions 211, 212. FIG. 6 shows that detection information 201 is initially ascertained in that receive information 202 is Fourier-transformed in the direction of first dimension 221 (by further frequency analysis 104'). This first dimension 221 may be specific to the distance of object 5 from vehicle 1. The spectra resulting from further frequency analysis 104' (carried out along first dimension 221) may be arranged in detection information 201, for example column by column, so that the orientation of dimensions 221, 222 is retained.

The particular subareas may then be defined in detection information 201 row by row and thus comprise one or multiple determined rows. As is apparent in FIG. 6, some of the rows have a stronger signal (cf. dashed lined of greater line thickness), while others have a weaker one (cf. dashed lines with lesser line thickness, which thus have only a lower power according to the evaluation criterion). The rows with the weaker signal may be identified and market, and a windowing 103 may be carried out, using a second window function 212 of rectangular window function 212, according to a selection according to the evaluation criterion. For the remaining partial areas, however, window function 211 which differs from a rectangular window function 212 may be used according to this selection. The windowings may take place in connection with frequency analysis 104, so that, for example, the windowed data is Fourier-transformed. The windowings carried out row by row may thus result in spectra which are arranged row by row in frequency information 231 by means of a subsequent frequency analysis 104 along second dimension 222. Second dimension 222 may be used in this way to determine the relative velocity. In the variant shown in FIG. 6, frequency information 231 may be final frequency information 234, i.e. the final range Doppler spectrum, which is used to detect the objects and parameters based on provided target information 235.

According to FIGS. 1 through 7, detection information 201 may be designed as a two-dimensional matrix, which includes a piece of distance information relating to object 5 in a first dimension and is specific to a relative velocity of object 5 in a second dimension.

It is conceivable to carry out the following steps according to FIGS. 3 and 6:

Carrying out the selection of the different window functions 211, 212, depending on a signal strength, in the particular subarea of detection information 201, this signal strength also being specific to the signal strength of target information 235, as highlighted in FIG. 6 based on the line thickness or dot size;

Carrying out windowing 103 of the subarea, using selected window function 211.

Figure 4:
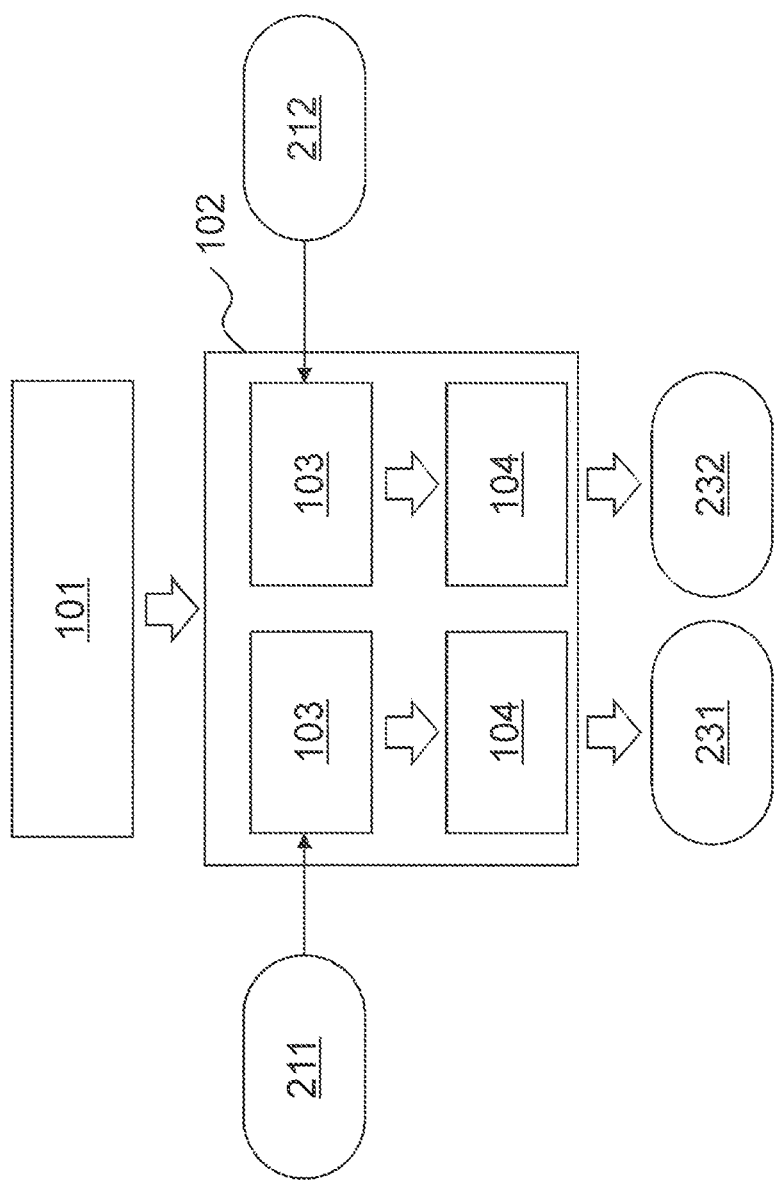
Figure 5:
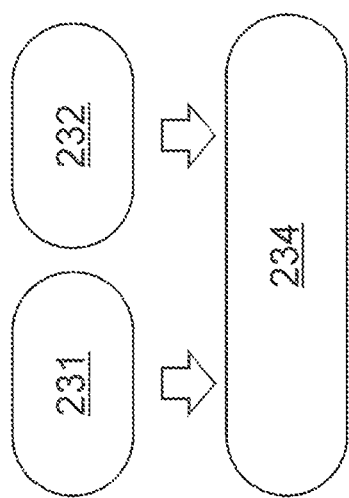

According to a variant shown in FIGS. 4, 5 and 7, windowing 103 and frequency analysis 104 of detection information 201 may be carried out during processing 102 for each of window functions 211, 212 for the purpose of obtaining in each case a piece of frequency information 231, 232 with the aid of one of window functions 211, 212. Processing 102 may comprise the following steps:

Carrying out windowing 103 of detection information 201 with the aid of a first 211 of the different window functions 211, 212 for the purpose of obtaining a first 231 of pieces of frequency information 231, 232 assigned to first window function 211 by means of frequency analysis 104 of windowed detection information 201.

Carrying out windowing 103 of (the same) detection information 201 with the aid of a second 212 of the different window functions 211, 212 for the purpose of obtaining a second 232 of pieces of frequency information 231, 232 assigned to second window function 212 by means of frequency analysis 104 of windowed detection information 201.

Ascertaining the signal strength of particular piece of target information 235 in at least one of pieces of frequency information 231, 232;

Carrying out a selection of pieces of target information 235 from the different pieces of frequency information 231, 232, depending on the ascertained signal strength, for the purpose of providing target information 235 with the aid of different window functions 211, 212 of windowing 103, depending on the evaluation criterion.

FIG. 7 shows that only the "strong" pieces of target information 235 result from first window function 211 or first piece of frequency information 231, due to this selection, and remaining pieces of target information 235 are substituted from second piece of frequency information 232. First window function 211 may be, for example, a Hann window, and/or second window function 212 may be a rectangular window function 212. In addition, a final piece of frequency information 234 may be determined as the result of processing 102, which is made up of different pieces of frequency information 231, 232 for the purpose of finally providing pieces of target information 235 with the aid of different window functions 211, 212 of windowing 103. The evaluation criterion may furthermore comprise a comparison with a predefined threshold value for the purpose of differentiating the strong signals from the weak signals.

The above explanation of the specific embodiments describes the present invention exclusively within the scope of examples. Individual features of the specific embodiments may, of course, be freely combined with each other if technically reasonable, without departing from the scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for providing at least one piece of target information relating to at least one object detected by a radar system of a vehicle, the method comprising:
    providing a piece of detection information of the radar system;
    carrying out a processing of the detection information which includes at least one windowing and performing at least one frequency analysis of the detection information to provide therefrom the at least one piece of target information,
    wherein the at least one piece of target information is provided via different window functions of the windowing depending on an evaluation criterion, the evaluation criterion being specific to a signal strength of the at least one piece of target information,
    wherein, during the processing, the windowing and the frequency analysis of the detection information is carried out for each of the different window functions to obtain, in each of the different window functions, a piece of frequency information, and
    wherein the processing comprises:
        carrying out the windowing of the detection information with the aid of a first window function of the different window functions to obtain a first piece of frequency information assigned to the first window function by the frequency analysis of the windowed detection information;
        carrying out the windowing of the detection information with the aid of a second window function of the different window functions to obtain a second piece of frequency information assigned to the second window function by the frequency analysis of the windowed detection information;
        ascertaining the signal strength of the at least one piece of target information in at least one of the first and second pieces of frequency information; and
        carrying out a selection of the at least one piece of target information from the first and second pieces of frequency information depending on the ascertained signal strength, for the purpose of providing the at least one piece of target information with the aid of the different window functions of the windowing depending on the evaluation criterion.

2. The method according to claim 1, wherein the different window functions of the windowing comprise a rectangular window function and a window function deviating from the rectangular window function, the window function deviating from the rectangular window function being the first window function and the rectangular window function being the second window function.

3. The method according to claim 2, wherein the window function deviating from the rectangular window function is designed to carry out a weakening of the detection information during the windowing according to a predefined weighting.

4. The method according to claim 1, wherein, during the processing, the windowing is carried out for different subareas of the detection information using the different window functions, and wherein for each respective subarea of the different subareas, the following steps are performed:
    carrying out a selection of one of the different window functions depending on the signal strength of the respective subarea of the detection information; and
    carrying out the windowing of the respective subarea using the selected one of the different window functions.

5. The method according to claim 1, wherein at least one parameter of the at least one object is ascertained by evaluating at least one piece of target information.

6. The method according to claim 5, wherein the at least one parameter comprises a distance of the at least one object relative to the vehicle.

7. The method according to claim 5, wherein the at least one parameter comprises a velocity of the at least one object relative to the vehicle.

8. The method according to claim 1, wherein the detection information is ascertained by:
    detecting a receive signal in a time range; and
    carrying out a Fourier transform to ascertain the detection information from the receive signal so that, due to the Fourier transform, the detection information comprises at least one spectrum which is specific to a distance of the at least one object relative to the vehicle.

9. The method according to claim 1, wherein, during the processing, the at least one frequency analysis is carried out in each case in the form of a Fourier transform to ascertain a piece of frequency information from the detection information so that the frequency information comprises at least one spectrum which is specific to a velocity of the at least one object relative to the vehicle.

10. The method according to claim 1, wherein the detection information is a two-dimensional matrix, which includes a piece of distance information relating to the at least one object in a first dimension and is specific to a relative velocity of the at least one object in a second dimension.

11. The method according to claim 1, wherein a final piece of frequency information is determined as the result of the processing, which is made up of the first and second pieces of frequency information for the purpose of finally providing the at least one piece of target information with the aid of the different window functions of the windowing.

12. The method according to claim 11, wherein a selection is carried out for each of the at least one piece of target information based on the evaluation criterion, with the aid of which the at least one piece of target information is provided in the final piece of frequency information from the first and second pieces of frequency information.

13. The method according to claim 1, wherein the evaluation criterion comprises a comparison with a predefined threshold value.

14. The method according to claim 1, wherein a selection of the different window functions based on the evaluation criterion is carried out in such a way that strong pieces of target information are optimized by the selected window function but weakened to a greater degree, and weak pieces of target information are weakened to a lesser degree by the selected window function and are thus retained.

\* \* \* \* \*